(12) United States Patent
Guan

(10) Patent No.: US 6,423,794 B1
(45) Date of Patent: Jul. 23, 2002

(54) POLYMERIZATION OF ETHYLENE

(75) Inventor: Zhibin Guan, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/539,560

(22) Filed: Mar. 31, 2000

Related U.S. Application Data

(60) Provisional application No. 60/127,324, filed on Apr. 1, 1999.

(51) Int. Cl.$^7$ .............................. C08F 4/44; C08F 10/02; C08F 110/02
(52) U.S. Cl. ....................... 526/139; 526/141; 526/161; 526/172; 526/352; 502/155; 556/21; 556/28
(58) Field of Search .............................. 526/139, 141, 526/161, 172, 352; 502/155; 556/21, 28

(56) References Cited

U.S. PATENT DOCUMENTS 6,177,528 B1 * 1/2001 LaPointe et al. ............. 526/139

FOREIGN PATENT DOCUMENTS

| WO | WO97/48735 | 12/1997 | ............. C08F/4/70 |
| WO | WO98/40420 | 9/1998 | ............. B01J/31/18 |

* cited by examiner

*Primary Examiner*—David W. Wu
*Assistant Examiner*—R. Harlan

(57) ABSTRACT

Complexes of certain transition metals with certain phosphorous-nitrogen bidentate ligands are part of all of catalyst systems for the polymerization of ethylene. Under certain polymerization conditions novel, highly branched, homopolyethylenes may be produced.

22 Claims, No Drawings

POLYMERIZATION OF ETHYLENE

CROSS-REFERENCE TO RELATED APPLICATION

This application claims priority under 35 U.S.C. §119 from U.S. Provisional Application Ser. No. 60/127,324 (filed Apr. 1, 1999), which is incorporated by reference herein as if fully set forth.

FIELD OF THE INVENTION

Transition metal complexes of selected bidentate ligands containing both phosphorous and nitrogen groups which coordinate to certain early and late transition metals are active catalysts (sometimes in the presence of other compounds) for the polymerization of ethylene. Polyethylenes prepared by some of these catalysts under certain conditions are novel, being highly branched and apparently having exceptionally stiff polymer chains in solution.

TECHNICAL BACKGROUND

Polyethylenes are very important items of commerce, large quantities of various grades of these polymers being produced annually for a large number of uses, such as packaging films and moldings. There are many different methods for making such polymers, including many used commercially, such as free radical polymerization to make low density polyethylene, and many so-called coordination catalysts such as Ziegler-Natta-type and metallocene-type catalysts. Each of these catalyst systems has its advantages and disadvantages, including cost of the polymerization and the particular structure of the polyethylene produced. Due to the importance of polyethylenes, new catalyst systems which are economical and/or produce new types of polyethylenes are constantly being sought.

WO98/40420 describes the use of certain late transition metal complexes of ligands containing phosphorous and nitrogen as ingredients in polymerization systems for olefins. Many of the ligands disclosed herein are different from those disclosed in this reference.

WO97/48735 generally describes the use of certain complexes of late transition metals are polymerizations catalysts for olefins. Among the ligands in these complexes are those which contain both phosphorous and nitrogen. None of the ligands described herein are specifically described in this reference.

Linear polyethylene is reported (J. Brandrup, et al., Ed., *Polymer Handbook*, 3$^{rd}$ Ed., John Wiley & Sons, New York, 1989, p. VII/6) to have a Mark-Houwink constant ($\alpha$) of about 0.6–0.7 in 1,2,4-trichlorobezene at 135° C. No mention is made of any polyethylenes with higher Mark-Houwink constants.

SUMMARY OF THE INVENTION

This invention concerns a first process for the production of polyethylene, comprising the step of contacting, at a temperature of about –100° C. to about +200° C., ethylene and a Ti, Cr, V, Zr, Hf or Ni complex of a ligand of the formula

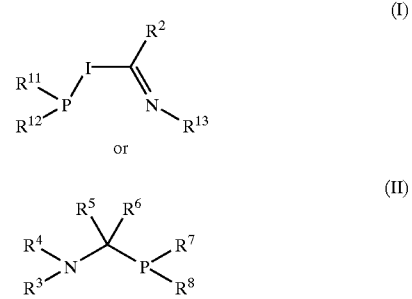

wherein:
T is hydrocarbylene, substituted hydrocarbylene or —$CR^9R^{10}$—;
$R^2$ is hydrogen, hydrocarbyl or substituted hydrocarbyl;
$R^3$ and $R^4$ are each independently hydrocabyl or substituted hydrocarbyl, provided that a carbon atom bound to a nitrogen atom has at least two other carbon atoms bound to it;
$R^5$ and $R^6$ are each independently hydrogen, hydrocarbyl or substituted hydrocarbyl;
$R^7$ and $R^8$ are each independently hydrocarbyl or substituted hydrocarbyl, provided that a carbon atom bound to a phosphorous atom has at least two other carbon atoms bound to it;
$R^9$ and $R^{10}$ are each independently hydrogen, hydrocarbyl or substituted hydrocarbyl;
$R^{11}$ and $R^{12}$ are each independently hydrocarbyl or substituted hydrocarbyl;
$R^{13}$ is hydrocarbyl or substituted hydrocarbyl; and provided that $R^2$ and $R^9$ taken together may form a ring.

Also disclosed herein is a second process for the production of polyethylene, comprising the step of contacting, at a temperature of about –100° C. to about +200° C., ethylene, a compound of the formula

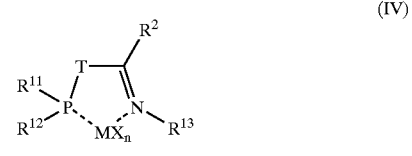

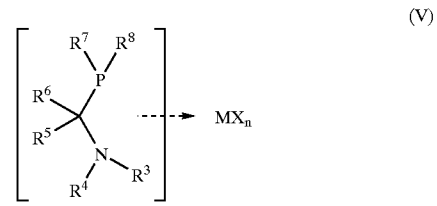

and:
(a) a first compound W, which is a neutral Lewis acid capable of abstracting X$^-$ and alkyl group or a hydride group from M to form WX$^-$, (WR$^{20}$)$^-$ or WH$^-$ and which is also capable of transferring an alkyl group or a hydride to M, provided that WX$^-$ is a weakly coordinating anion; or
(b) a combination of second compound which is capable of transferring an alkyl or hydride group to M and a third compound which is a neutral Lewis acid which is capable of abstracting X⁻, a hydride or an alkyl group from M to form a weakly coordinating anion;

wherein:

M is Ti, Cr, V, Zr, Hf or Ni; each X is an anion;

n is an integer so that the total number of negative charges on said anion or anions is equal to the oxidation sate of M;

T is hydrocarbylene, substituted hydrocarbylene or —CR⁹R¹⁰—;

R² is hydrogen, hydrocarbyl or substituted hydrocarbyl;

R³ and R⁴ are each independently hydrocarbyl or substituted hydrocarbyl, provided that a carbon atom bound to a nitrogen atom has at least two other carbon atoms bound to it;

R⁵ and R⁶ are each independently hydrogen, hydrocarbyl or substituted hydrocarbyl;

R⁷ and R⁸ are each independently hydrocarbyl or substituted hydrocarbyl, provided that a carbon atom bound to a phosphorous atom has at least two other carbon atoms bound to it;

R⁹ and R¹⁰ are each independently hydrogen, hydrocarbyl or substituted hydrocarbyl;

R¹¹ and R¹² are each independently hydrocarbyl or substituted hydrocarbyl;

R¹³ is hydrocarbyl or substituted hydrocarbyl; and provided that R² and R⁹ taken together may form a ring.

This invention also concerns a third process for the production of polyethylene, comprising the step of contacting, at a temperature of about −100° C. to about +200° C., ethylene and a compound of the formula

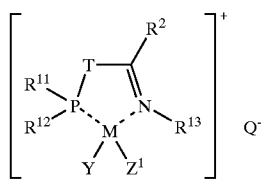
(VI)

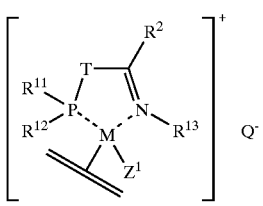
(VII)

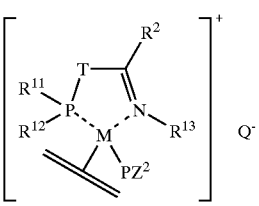
(VIII)

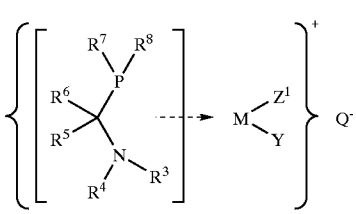
(IX)

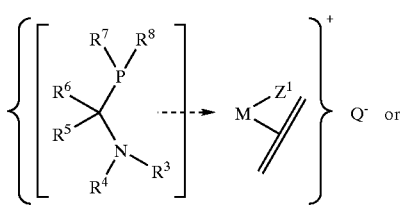
(X)

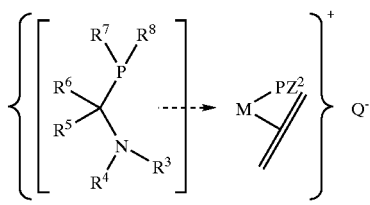
(XI)

wherein:

M is Ti, Cr, V, Zr, Hf or Ni;

n is an integer so that the total number of negative charges on said anion or anions is equal to the oxidation sate of M;

T is hydrocarbylene, substituted hydrocarbylene or —CR⁹R¹⁰—;

R² is hydrogen, hydrocarbyl or substituted hydrocarbyl;

R³ and R⁴ are each independently hydrocabyl or substituted hydrocarbyl, provided that a carbon atom bound to a nitrogen atom has at least two other carbon atoms bound to it;

R⁵ and R⁶ are each independently hydrogen, hydrocarbyl or substituted hydrocarbyl;

R⁷ and R⁸ are each independently hydrocarbyl or substituted hydrocarbyl, provided that a carbon atom bound to a phosphorous atom has at least two other carbon atoms bound to it;

R⁹ and R¹⁰ are each independently hydrogen, hydrocarbyl or substituted hydrocarbyl;

R¹¹ and R¹² are each independently hydrocarbyl or substituted hydrocarbyl;

R¹³ is hydrocarbyl or substituted hydrocarbyl;

Z¹ is hydride or alkyl or any other anionic ligand into which ethylene can insert;

Y is a neutral ligand capable of being displaced by ethylene or a vacant coordination site;

Q is a relatively non-coordinating anion;

P is a divalent polyethylene group containing one or more ethylene units; and

Z² is an end group and provided that R² and R⁹ taken together may form a ring.

This invention also concerns a homopolyethylene which has a Mark-Houwink constant of about 1.0 or more when measured in 1,2,4-trichlorobenzene.

DETAILED DESCRIPTION OF THE PREFERRED EMBODIMENTS

A structure drawn such as (V),

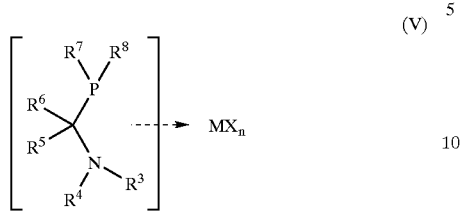

simply means that the ligand in the square bracket is coordinated to the metal containing moiety, as indicated by the arrow. Nothing is implied about what atoms in the ligand are coordinated to the metal.

Herein, certain terms are used. Some of them are:

A "hydrocarbyl group" is a univalent group containing only carbon and hydrogen. If not otherwise stated, it is preferred that hydrocarbyl groups herein contain 1 to about 30 carbon atoms.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take part in. Examples of functional groups include halo (fluoro, chloro, bromo and iodo), ether such as —$OR^{18}$ wherein $R^{18}$ is hydrocarbyl or substituted hydrocarbyl. In cases in which the functional group may be near a cobalt or iron atom, such as $R^4$, $R^5$, $R^8$, $R^{12}$, $R^{13}$, and $R^{17}$ the functional group should not coordinate to the metal atom more strongly than the groups in compounds containing $R^4$, $R^5$, $R^8$, $R^{12}$, $R^{13}$, and $R^{17}$ which are shown as coordinating to the metal atom, that is they should not displace the desired coordinating group.

By bound to a nitrogen or phosphorous atom is meant a nitrogen or phosphorous atom explicitly shown in compound (V) or one of its complexes.

By an "alkyl aluminum compound" is meant a compound in which at least one alkyl group is bound to an aluminum atom. Other groups such as alkoxide, hydride, and halogen may also be bound to aluminum atoms in the compound.

By "neutral Lewis base" is meant a compound, which is not an ion, which can act as a Lewis base. Examples of such compounds include ethers, amines, sulfides, and organic nitriles.

By "cationic Lewis acid" is meant a cation which can act as a Lewis acid. Examples of such cations are sodium and silver cations.

By relatively noncoordinating (or weakly coordinating) anions are meant those anions as are generally referred to in the art in this manner, and the coordinating ability of such anions is known and has been discussed in the literature, see for instance W. Beck., et al., Chem. Rev., vol. 88 p. 1405–1421 (1988), and S. H. Stares, Chem. Rev., vol. 93, p. 927–942 (1993), both of which are hereby included by reference. Among such anions are those formed from the aluminum compounds in the immediately preceding paragraph and $X^-$, including $R^9{}_3AlX^-$, $R^9{}_2AlClX^-$, $R^9AlCl_2X^-$, and "$R^9AlOX^-$", wherein $R^9$ is alkyl. Other useful noncoordinating anions include $BAF^-$ {BAF=tetrakis[3,5-bis (trifluoromethyl)phenyl]borate}, $SbF_6{}^-$, $PF_6{}^-$, and $BF_4{}^-$, trifluoromethanesulfonate, p-toluenesulfonate, $(R_fSO_2)_2N^-$, and $(C_6F_5)_4B^-$.

By an empty coordination site is meant a potential coordination site that is not occupied by a ligand. Thus if an ethylene molecule is in the proximity of the empty coordination site, the ethylene molecule may coordinate to the metal atom.

By a ligand that may add to ethylene is meant a ligand coordinated to a metal atom into which an ethylene molecule (or a coordinated ethylene molecule) may insert to start or continue a polymerization. For instance, this may take the form of the reaction (wherein L is a ligand):

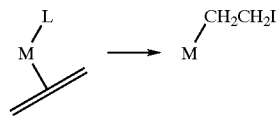

Preferred transition metals are Ti, Cr, V, and Ni, and Ni is especially preferred. It is believed that for the most part Ti, Cr, V and other early transition metals will give polyolefins with a "normal" amount of branching. For a discussionlof "normal" branching in polyolefins see WO96/23010, which is hereby included by reference. As can be seen from the results herein use of the Ni (and other) complexes often results in polymers with "abnormal" amounts of branching.

Preferred groups in compounds (I) and (II) and their corresponding metal complexes are:

$R^3$ is hydrocarbyl especially alkyl or alkyl or halogen substituted aryl, more especially alkyl containing 2 to 6 carbon atoms and 2,6-dialkylphenyl;

$R^4$ is hydrogen or alkyl, hydrogen especially when $R^3$ is alkyl or halogen substituted aryl;

$R^7$ and $R^8$ are independently saturated hydrocarbyl, especially alkyl or cycloalkyl containing 3 to 8 carbon atoms;

$R^5$ and $R^6$ are independently hydrogen or methyl, more preferably both hydrogen;

$R^3$ is alkyl or halogen substituted aryl, especially 2,6-disubstituted phenyl which may optionally be substituted in other positions;

$R^{11}$ and $R^{12}$ are each independently hydrocarbyl or substituted hydrocarbyl, especially hydrocarbyl in which the carbon atom bound to the phosphorous atom is bound to at least 2 other carbon atoms;

T is —$CHR^{14}$— wherein $R^{14}$ is hydrogen or alkyl containing 1 to 6 carbon atoms, T is —$CR^9R^{10}$—, or T is o-phenylene;

$R^{10}$ is hydrogen and $R^2$ taken together form a ring, especially a carbocyclic ring.

The ring formed by $R^2$ and $R^9$ may be part of monocyclic ring system, or part of another type of ring system, such as a bicyclic ring system. Preferred groups when $R^2$ and $R^9$ taken together form a ring are

(III)

—$(CH_2)_3$— and —$(CH_2)_4$—.

Specific preferred compounds for (I) and (II), and their corresponding transition metal complexes, are:

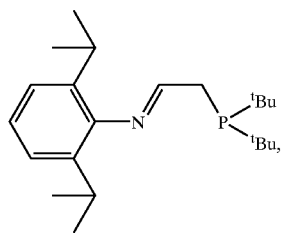
(Ia)

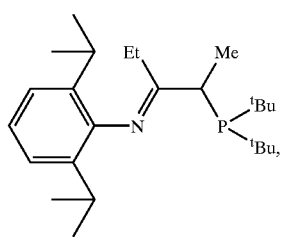
(Ib)

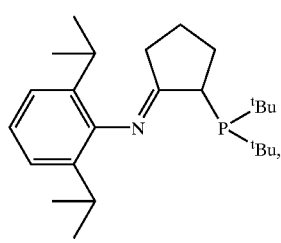
(Ic)

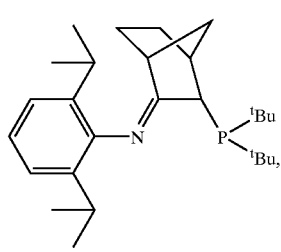
(Id)

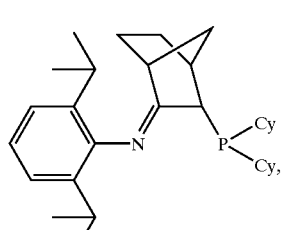
(Ie)

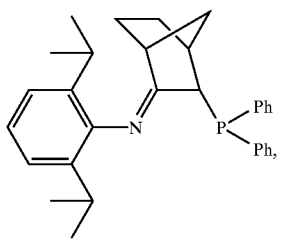
(If)

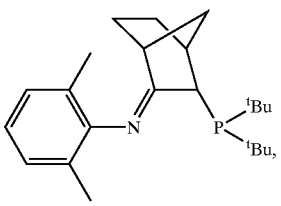
(Ig)

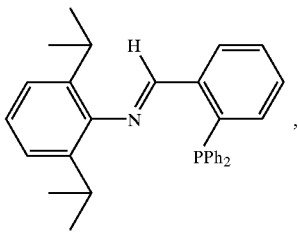
(Ih)

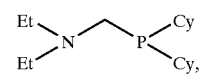
(IIa)

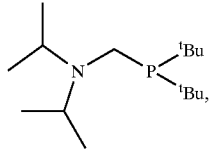
(IIb)

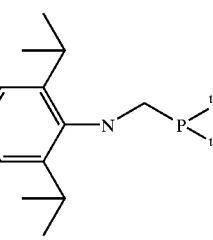
(IIc)

In these formulas and otherwise herein Bu is butyl, Cy is cyclohexyl, and Ph is phenyl.

In all the polymerization processes herein, the temperature at which the polymerization is carried out is about −100° C. to about +200° C., preferably about 0° C. to about 150° C., more preferably about 25° C. to about 100° C. The ethylene concentration at which the polymerization is carried out is not critical, atmospheric pressure to about 275 MPa being a suitable range for ethylene and propylene.

The polymerization processes herein may be run in the presence of various liquids, particularly aprotic organic liquids. The catalyst system, ethylene, and polyethylene may be soluble or insoluble in these liquids, but obviously these liquids should not prevent the polymerization from occurring. Suitable liquids include alkanes, cycloalkanes, selected halogenated hydrocarbons, and aromatic hydrocarbons. Hydrocarbons are the preferred solvent. Specific useful solvents include hexane, toluene, benzene, chloroform, methylene chloride, 1,2,4-trichorobenzene, p-xylene, and cyclohexane.

The catalysts herein may be "heterogenized" by coating or otherwise attaching them to solid supports, such as silica or alumina. Where an active catalyst species is formed by reaction with a compound such as an alkylaluminum compound, a support on which the alkylaluminum compound is first coated or otherwise attached is contacted with the nickel compound precursor to form a catalyst system in which the active nickel catalyst is "attached" to the solid support. These supported catalysts may be used in polymerizations in organic liquids, as described in the immediately preceding paragraph. They may also be used in so-called gas phase polymerizations in which the ethylene being polymerized are added to the polymerization as a gas and no liquid supporting phase is present.

It is known that certain transition metal containing polymerization catalysts including those disclosed herein, are especially useful in varying the branching in polyolefins made with them, see for instance WO96/23010, WO97/02298, WO98/30610 and WO98/30609, incorporated by reference herein for all purposes as if fully set forth. It is also known that blends of distinct polymers, that vary for instance in the properties listed above, may have advantageous properties compared to "single" polymers. For instance it is known that polymers with broad or bimodal molecular weight distributions may be melt processed (be shaped) more easily than narrower molecular weight distribution polymers. Similarly, thermoplastics such as crystalline polymers may often be toughened by blending with elastomeric polymers.

Therefore, methods of producing polymers which inherently produce polymer blends are useful especially if a later separate (and expensive) polymer mixing step can be avoided. However in such polymerizations one should be aware that two different catalysts may interfere with one another, or interact in such a way as to give a single polymer.

In such a process the catalysts disclosed herein can be termed the first active polymerization catalyst. Monomers useful with these catalysts are those described (and also preferred) above.

A second active polymerization catalyst (and optionally one or more others) is used in conjunction with the first active polymerization catalyst. The second active polymerization catalyst may be another late transition metal catalyst, for example as described in previously incorporated WO96/23010, WO97/02298, WO98/30610, WO98/30609 and WO98/27124. Other useful types of catalysts may also be used for the second active polymerization catalyst. For instance so-called Ziegler-Natta and/or metallocene-type catalysts may also be used. These types of catalysts are well known in the polyolefin field, see for instance *Angew. Chem., Int. Ed. Engl.*, vol. 34, p. 1143–1170 (1995), EP-A-0416815 and U.S. Pat. No. 5,198,401 for information about metallocene-type catalysts; and J. Boor Jr., *Ziegler-Natta Catalysts and Polymerizations*, Academic Press, New York, 1979 for information about Ziegler-Natta-type catalysts, all of which are hereby included by reference for all purposes. Many of the useful polymerization conditions for all of these types of catalysts and the first active polymerization catalysts coincide, so conditions for the polymerizations with first and second active polymerization catalysts are easily accessible. Oftentimes the "co-catalyst" or "activator" is needed for metallocene or Ziegler-Natta-type polymerizations. In many instances the same compound, such as an alkylaluminum compound, may be used as an "activator" for some or all of these various polymerization catalysts.

Suitable catalysts for the second polymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well-known constrained geometry catalysts, as described in EP-A-0416815, EP-A-0420436, EP-A-0671404 and EP-A-0643066, and WO91/04257.

Finally, the class of transition metal complexes described in WO96/13529 can be used.

All of the above references are hereby included by reference for all purposes as if fully set forth.

In one preferred process described herein the first olefin(s) [the monomer(s) polymerized by the first active polymerization catalyst] and second olefin(s) [the monomer(s) polymerized by the second active polymerization catalyst] are identical, and preferred olefins in such a process are the same as described immediately above. The first and/or second olefins may also be a single olefin or a mixture of olefins to make a copolymer. Again it is preferred that they be identical particularly in a process in which polymerization by the first and second active polymerization catalysts make polymer simultaneously.

In some processes herein the first active polymerization catalyst may polymerize a monomer that may not be polymerized by said second active polymerization catalyst, and/or vice versa. In that instance two chemically distinct polymers may be produced. In another scenario two monomers would be present, with one polymerization catalyst producing a copolymer, and the other polymerization catalyst producing a homopolymer, or two copolymers may be produced which vary in the molar proportion or repeat units from the various monomers. Other analogous combinations will be evident to the artisan.

In another variation of this process one of the polymerization catalysts makes an oligomer of an olefin, preferably ethylene, which oligomer has the formula $R^{70}CH\!=\!CH_2$, wherein $R^{70}$ is n-alkyl, preferably with an even number of carbon atoms. The other polymerization catalyst in the process them (co)polymerizes this olefin, either by itself or preferably with at least one other olefin, preferably ethylene, to form a branched polyolefin. Preparation of the oligomer (which is sometimes called an α-olefin) by a second active polymerization-type of catalyst can be found in previously incorporated WO96/23010 and WO99/02472.

Likewise, conditions for such polymerizations, using catalysts of the second active polymerization type, will also be found in the appropriate above mentioned references.

Two chemically different active polymerization catalysts are used in this polymerization process. The first active polymerization catalyst is described in detail above. The second active polymerization catalyst may also meet the limitations of the first active polymerization catalyst, but must be chemically distinct. For instance, it may have a different transition metal present, and/or utilize a different type of ligand and/or the same type of ligand which differs in structure between the first and second active polymerization catalysts. In one preferred process, the ligand type and the metal are the same, but the ligands differ in their substituents.

Included within the definition of two active polymerization catalysts are systems in which a single polymerization catalyst is added together with another ligand, preferably the same type of ligand, which can displace the original ligand coordinated to the metal of the original active polymerization catalyst, to produce in situ two different polymerization catalysts.

The molar ratio of the first active polymerization catalyst to the second active polymerization catalyst used will depend on the ratio of polymer from each catalyst desired, and the relative rate of polymerization of each catalyst under the process conditions. For instance, if one wanted to prepare a "toughened" thermoplastic polyethylene that contained 80% crystalline polyethylene and 20% rubbery polyethylene, and the rates of polymerization of the two catalysts were equal, then one would use a 4:1 molar ratio of the catalyst that gave crystalline polyethylene to the catalyst that gave rubbery polyethylene. More than two active polymerization catalysts may also be used if the desired product is to contain more than two different types of polymer.

The polymers made by the first active polymerization catalyst and the second active polymerization catalyst may be made in sequence, i.e., a polymerization with one (either first or second) of the catalysts followed by a polymerization with the other catalyst, as by using two polymerization vessels in series. However it is preferred to carry out the polymerization using the first and second active polymerization catalysts in the same vessel(s), i.e., simultaneously. This is possible because in most instances the first and second active polymerization catalysts are compatible with each other, and they produce their distinctive polymers in the other catalyst's presence. Any of the processes applicable to the individual catalysts may be used in this polymerization process with 2 or more catalysts, i.e., gas phase, liquid phase, continuous, etc.

The polymers produced by this "mixed catalyst" process may vary in molecular weight and/or molecular weight distribution and/or melting point and/or level of crystallinity, and/or glass transition temperature and/or other factors. For copolymers the polymers may differ in ratios of comonomers if the different polymerization catalysts polymerize the monomers present at different relative rates. The polymers produced are useful as molding and extrusion resins and in films as for packaging. They may have advantages such as improved melt processing, toughness and improved low temperature properties.

Hydrogen may be used to lower the molecular weight of polyethylene produced in the first or second processes. It is preferred that the amount of hydrogen present be about 0.01 to about 50 mole percent of the ethylene present, preferably about 1 to about 20 mole percent. The relative concentrations of ethylene and hydrogen may be regulated by their partial pressures.

Included herein within the definitions of all the polymerization processes are mixtures of starting materials that lead to the formation in situ of the transition metal compounds specified in all of the polymerization processes.

Some of the homopolyethylenes produced herein have exceptionally high Mark-Houwink constants. Most homopolyethylenes have such constants in the range of about 0.5 to 0.75, depending on the particular solvent and temperature used, as well as the degree of branching in the polyethylene. It is believed that "Generally, $0.5 < \alpha < 0.8$ for flexible chains, $0.8 < \alpha < 1.0$ for inherently stiff molecules (e.g. cellulose derivatives, DNA) and $1.0 < \alpha < 1.7$ for highly extended chains (e.g. polyelectrolytes in solutions of very low ionic strength).", quotation from P. A. Lovell in G. Allen, et al., Ed., *Comprehensive Polymer Science*, Vol. 1, Pergamon Press, Oxford, 1989, p. 190. Why these polyethylenes behave as extended chain molecules in solution is not understood, but it is suspected that the branching patterns in these polymers are different from those in other branched homopolyethylenes, see for instance WO96/23010.

The polyethylenes with high Mark-Houwink constants are especially useful as viscosity modifiers, and are also useful the uses outlined for highly branched polyethylenes in WO96/23010, which is hereby included by reference, such as bases for lubricating oils, and lubricating oil viscosity modifiers. These polymers may be made by polymerizing using catalysts such as Ib, Ic and Id, more preferably Ib, and especially using higher polymerization temperatures, such as temperatures above about 50° C., especially above about 70° C., with maximum polymerization temperatures as described above.

In the Examples the following abbreviations are used:
α—Mark-Houwink constant
[η]—intrinsic viscosity
DSC—Differential Scanning Calorimetry
GPC—Gel Permeation Chromatography
MI—melt index
MMAO—methylaluminoxane modified with isobutyl groups
Mn—number average molecular weight
Mw—weight average molecular weight
PMAO-IP—methylaluminoxane
TCB—1,2,4-trichlorobenzene
THF—tetrahydrofuran
Tm—melting point Melting points were determined by DSC, using a heating rate of 10° C./min. The melting point was taken on the $2^{nd}$ heat, and the peak of the melting endotherm was taken as the melting point.

Intrinsic viscosity was measured in TCB at a temperature of 135° C.

Branching levels as measured by $^1H$ and $^{13}C$ NMR were determined as described in WO96/23010.

Size Exclusion Chromatography/Viscometry

All measurements and calculations relating to Mark-Houwink constants and for measurement of intrinsic viscosity were done as follows:

Measurements were made using a Waters "150-CV plus-"chromatograph (Waters Corp.) with four Shodex® KF-806M columns (made by Showa Denko K. K., available from Showa Denko America, Inc., 280 Park Ave., New York, N.Y. 10017 U.S.A.) operating at 135° C. in TCB at a flow rate of 1 mL/min. Injection volume was 150 microliters at a concentration of 1.5 mg/mL. Narrow fraction polystyrene standards from Polymer Laboratories Inc. were used to develop the universal calibration. A Waters Millennium® 2020 data system with GPCV software (Waters Corp.), version 2.15.1, was used to acquire and process the data. Intrinsic viscosities were measured at 35° C.

Data Treatment and Resulting Mark-Houwink Constants

The Mark-Houwink constants of the intrinsic viscosity-molecular weight relationship were obtained from a fit of the lower molecular-weight portion of the good data region; however, because the relationship was found to be nearly linear throughout the entire distribution of all subject polymers, the reported constants described the relationship of the higher molecular-weight species as well.

EXAMPLE 1

Synthesis of Ligand (Ih)

2-(Diphenylphosphino)benzaldehyde (1.00 g, 3.44 mmol) and 2,6-diisopropylaniline (0.66 mL, 3.82 mmol) were mixed in 30 mL of anhydrous methanol. After addition of 10 drops of formic acid as the catalyst, the mixture was refluxed under nitrogen for 3 d. Upon cooling the reaction solution, yellow crystals precipitated. The solid was filtered, washed with methanol, and dried (1.129 g, 73% yield). The $^1$H NMR spectrum agrees with the chemical structure of (Ih). $^1$H NMR (CD$_2$Cl$_2$, 500 MHz): 8.86 ppm (d, 1H, Ar-C$\underline{H}$=N), 8.25 ppm (dd, 1H, proton adjacent to the imine group on the bridge phenyl ring), 6.90–7.50 ppm (m, 16H, aromatic protons), 2.72 ppm (m, 2H, C$\underline{H}$(CH$_3$)$_2$), 0.99 ppm (d, 12H, CH(C$\underline{H}_3$)$_2$). $^{31}$P NMR (CD$_2$Cl$_2$, 200 MHz): 13.94 (s)

EXAMPLES 2–8

Synthesis of (Ia), (Ib), (Ic), (Id), (Ie), (If) and (Ig)

They were synthesized in similar procedure by the following general route:

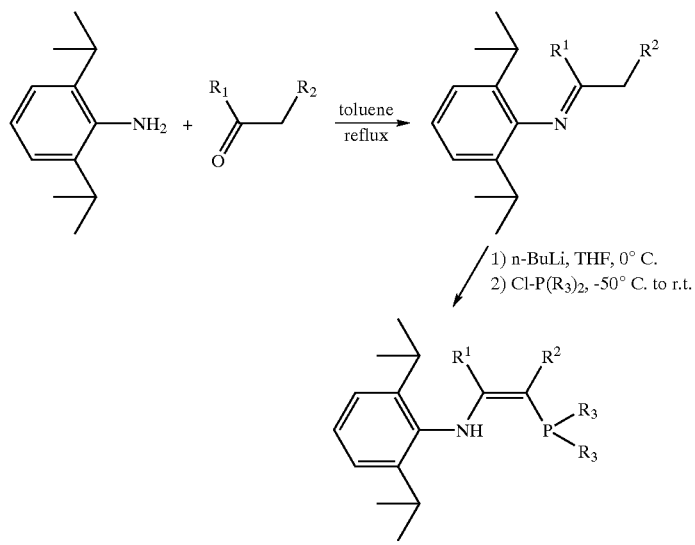

To make (Ig), 2,6-dimethylaniline was used instead of 2,6-diisopropylaniline.

As an example the synthesis of (Id) is described below: Norcamphor (8.0 g, 0.073 mol) and 2,6-diisopropylaniline (21.6 g, 0.11 mol) were mixed in 60 mL of toluene. A small amount of p-toluenesulfonic acid was added into the solution as the catalyst. The solution was refluxed for 2 d during which time a Dean-Stark trap was used to remove water formed during the reaction. After reaction was completed, the solvent was removed by vacuum leaving an oily mixture. The product was obtained by crystallization from diethyl ether solution (11.0 g, 56% yield). Some of the products were purified by flash column separation.

To a solution of lithium diisopropylamide (1.5 M LDA solution in cyclohexane, 5.5 mL, 8.6 mmol) in THF (20 mL) at 0° C., the imine product from the previous step (2.0 g, 7.42 mmol) in 10 mL THF was added dropwise. After being stirred at 0° C. for 4 h, the mixture was cooled to –100° C. using ether/dry ice cold bath. Then di-t-butylchlorophosphine (1.34 g, 7.42 mmol) in 20 mL THF was syringed into the reaction mixture dropwise. After the addition was finished, the mixture was stirred at –50° C. overnight, then at RT for 2 d. After removal of solvent, the residue was dissolved in 50 mL of diethyl ether, and the solution was subsequently poured into 100 mL aq. 1 N NH$_4$Cl. The organic layer was collected, and the aqueous layer was extracted with diethyl ether (3×5 mL). The organic phases were combined, washed with water, dried with MgSO$_4$ and finally the solvent was removed. The pure product was obtained by crystallization of the crude product from hexane twice (0.75 g, 24% yield).

EXAMPLES 9–10

Synthesis of (IIa) and (IIb)

These compounds were synthesized by the formic acid catalyzed Mannich reaction between formaldehyde, a dialkyl amine, and a dialkylphosphine.

The synthesis of (IIa) is described here: Diethylamine (0.57 mL, 5.51 mmol), formaldehyde (0.39 mL of 37 wt % aq. Solution, 5.20 mmol) and dicyclohexylphosphine (1.0 mL, 5.18 mmol) were mixed in 5.0 mL of degassed dry THF. After addition of two drops of formic acid, the mixture was refluxed under nitrogen overnight. Then all volatile materials were removed under vacuo to give an oily product. The structure of the product was confirmed by $^1$H, $^{31}$P NMR and GC/MS. $^1$H NMR (CD$_2$Cl$_2$, 500 MHz): 2.51 ppm (s, 2H, NC$\underline{H}_2$P), 2.48 ppm (q, 4H, CH$_3$C$\underline{H}_2$—N), 1.1–1.7 ppm (m, 22H, protons on cyclohexyl groups), 0.90 ppm (t, 6H, C$\underline{H}_3$CH$_2$—N). $^{31}$P NMR (CD$_2$Cl$_2$, 200 MHz): 15.78 (s)

EXAMPLES 11–20

Synthesis of Ni Complexes

NiBr$_2$ complexes of the compounds prepared in Examples 1–10 were prepared by similar procedures. As an example, the synthesis of the complex (Id) —NiBr$_2$ is described below: Into a suspension of (DME)NiBr$_2$ (90 mg, 0.29 mmol) in 5 mL dichloromethane, a solution of (Id) (121 mg, 0.29 mmol) in 5 mL of dichloromethane was added. The mixture was stirred at RT overnight. The solution was passed through Celite® to remove any insoluble material, then concentrated under vacuum by removal of the majority of the solvent. Finally, a large excess of hexane was added to the solution to precipitate the complex. The purple complex was filtered, washed with hexane, and dried (85 mg, 46% yield). When the ligands complex with metal ion, it isomerizes into imine form from the enamine form. The crystal structure agreed with the complex structure.

EXAMPLE 21

An evacuated 600 mL autoclave was charged with a solution of (Ih) —NiBr$_2$ complex (10 mg, 0.015 mmol) in 100 mL of toluene. To this solution was then added PMAO-IP (3.6 mL in 5 mL toluene, 15 mmol) under 690 MPa of ethylene. The resulting mixture was stirred at 500 rpm under 100 psi of ethylene and 35° C. for 1 h. A large amount of ethylene was consumed during this period. After venting the remaining ethylene and opening the autoclave, the liquid effervesced out indicating the formation of butene. $^1$H NMR of the crude product indicated the formation of ethylene oligomers.

EXAMPLE 22

An evacuated 600 mL autoclave was charged with a solution of (Ia) —NiBr$_2$ (50 mg, 0.105 mmol) in 100 mL of chlorobenzene. The autoclave was heated to 70° C. To this solution was then added PMAO-IP (12.7 mL in toluene, 0.0525 mol) under 3.5 MPa of ethylene. The resulting mixture was stirred at 70° C. under 3.5 MPa of ethylene for 3 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separatory funnel and the oil separated from the aqueous phase. The aqueous phase was extracted with 3×100 mL of hexane, and the hexane extracts combined with the oil. After being dried with MgSO$_4$, solvent was removed from the solution to give a gel like polymer (24.5 g). The branching distribution was quantified by $^{13}$C NMR. Branching per 1000 CH$_2$: Total methyls (110.3), Methyl (24.7), Ethyl (12.9), Propyl (13.3), Butyl (8.8), Amyl (12.1), and ≧Hexyl (27.3). GPC (in tetrahydrofuran vs. polystyrene standards): M$_n$=2450, M$_w$=3650, M$_w$/M$_n$=1.49.

EXAMPLE 23

An evacuated 600 mL autoclave was charged with a solution of (Ib) —NiBr$_2$ (20 mg, 0.033 mmol) in 100 mL of chlorobenzene. The autoclave was heated to 70° C. To this solution was then added PMAO-IP (4.0 mL in toluene, 16.5 mmol) under 3.5 MPa of ethylene. The resulting mixture was stirred at 70° C. under 3.5 MPa of ethylene for 7 h. Ethylene pressure was then vented and the reaction mixture quenched under air by the addition of 50 mL of isopropanol. The white powder was filtered, washed with methanol, and finally dried in vacuo (0.5 g ). The branching distribution was quantified by $^{13}$C NMR. Branching per 1000 CH$_2$: Total methyls (49.4), Methyl (22.3), Ethyl (9.3), Propyl (1.1), Butyl (3.0), Amyl (2.2), and >Hexyl (11.2). GPC (in TCB, by universal calibration using polyethylene standards): bimodal distribution with the high molecular weight peak at M$_n$=3.72×10$^5$, M$_w$=7.43×10$^5$, M$_w$/M$_n$=2.0, Mark-Houwink coefficient α=1.3; and the low molecular fraction at M$_n$=2150, M$_w$=2660, M$_w$/M$_n$=1.23.

EXAMPLE 24

An evacuated 600 mL autoclave was charged with a solution of (Ic) —NiBr$_2$ (20 mg, 0.033 mmol) in 100 mL of chlorobenzene. The autoclave was heated 70° C. To this solution was then added PMAO-IP (4.0 mL in toluene, 16.6 mmol) under 3.5 MPa of ethylene. The resulting mixture was stirred at 70° C. under 3.5 MPa of ethylene for 7 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 3×100 mL of hexane, and the hexane extracts combined with the oil. After being dried with MgSO$_4$, solvent was removed from the solution to give a soft waxy polymer (6.21 g). The branching distribution was quantified by $^{13}$C NMR. Branching per 1000 CH$_2$: Total methyls (50.3), Methyl (23.2), Ethyl (3.2), Propyl (0.5), Butyl (1.1), Amyl (7.0), and ≧Hexyl (20.3) (not corrected for end groups). GPC (in TCB, by universal calibration using polystyrene standards): M$_n$=1980, M$_w$=2690, M$_w$/M$_n$=1.4, [72 ]=0.079 dL/g, α=1.1

EXAMPLE 25

An evacuated 600 mL autoclave was charged with a solution of (Id) —NiBr$_2$ (20 mg, 0.032 mmol) in 100 mL of chlorobenzene. The autoclave was heated 70° C. To this solution was then added PMAO-IP (4.0 mL in toluene, 16.6 mmol) under 3.5 MPa of ethylene. The resulting mixture was stirred at 70° C. under 3.5 MPa of ethylene for 7 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 3×100 mL of hexane, and the hexane extracts combined with the oil. After being dried with MgSO$_4$, solvent was removed from the solution to give gel like polymer (9.64 g). The branching distribution was quantified by $^{13}$C NMR. Branching per 1000 CH$_2$: Total methyls (55.6), Methyl (21.9), Ethyl (3.0), Propyl (0.6), Butyl (1.6), Amyl (8.9), and ≧Hexyl (22.0). GPC (in TCB, by universal calibration using polystyrene standards): M$_n$=1410, M$_w$=1690, M$_w$/M$_n$=1.2, [η]=0.055 dL/g, α=1.3.

EXAMPLE 26

An evacuated 600 mL autoclave was charged with a solution of (Id) —NiBr$_2$ (20 mg, 0.032 mmol) in 100 mL of chlorobenzene. The autoclave was heated 70° C. To this solution was then added PMAO-IP (4.0 mL in toluene, 16.6 mmol) under 350 kPa of ethylene. The resulting mixture was stirred at 70° C. under 350 kPa of ethylene for 7 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separatory funnel and the oil separated from the aqueous phase. The aqueous phase was extracted with 4×40 mL of hexane, and the hexane extracts combined with the oil. After being dried with MgSO$_4$, solvent was removed from the solution to give polymer (4.5 g). The branching distribution was quantified by $^{13}$C NMR. Branching per 1000 CH$_2$: Total methyls (96.5), Methyl (16.7), Ethyl (5.5), Propyl (1.5), Butyl (5.0), Amyl (29.1), and ≧Hexyl (55.2). GPC (in THF vs. polystyrene standards): bimodal distribution with high molecular weight at M$_n$=3.18×10$^5$, M$_w$=7.53×10$^5$, M$_w$/M$_n$=2.37; and low molecular weight fraction with peak molecular weight at 614.

EXAMPLE 27

An evacuated 600 mL autoclave was charged with a solution of (Ic) —NiBr$_2$ (20 mg, 0.033 mmol) in 100 mL of chlorobenzene. The autoclave was heated 100° C. To this solution was then added PMAO-IP (4.0 mL in toluene, 16.6 mmol) under 3.5 MPa of ethylene. The resulting mixture was stirred at 100° C. under 3.5 MPa of ethylene for 2.8 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 4×40 mL of hexane, and the hexane extracts combined with the oil. After being dried with MgSO$_4$, solvent was removed from the solution to give an oily polymer (31.86 g). The total methyl per 1000 CH$_2$ was 295. GPC (in THF vs. polystyrene standards): bimodal distribution with high molecular weight at $M_n=2.73\times10^5$, $M_w=1.01\times10^6$, $M_w/M_n=3.69$; with the major fraction at very low molecular weight.

EXAMPLE 28

An evacuated 600 mL autoclave was charged with a solution of (Id) —NiBr$_2$ (20 mg, 0.033 mmol) in 100 mL of chlorobenzene. The autoclave was heated to 100° C. To this solution was then added PMAO-IP (4.0 mL in toluene, 16.6 mmol) under 3.5 MPa of ethylene. The resulting mixture was stirred at 100° C. under 3.5 MPa of ethylene for 2.8 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 4×40 mL of hexane, and the hexane extracts combined with the oil. After being dried with MgSO$_4$, solvent was removed from the solution to give oily polymer (12.0 g) The branching distribution was quantified by $^{13}$C NMR. Branching per 1000 CH$_2$: Total methyls (124.6), Methyl (14.2), Ethyl (11.7), Propyl (8.2), Butyl (8.8), Amyl (37.7), and ≧Hexyl (65.3). GPC (in THF vs. polystyrene standards): bimodal distribution with high molecular weight at $M_n=5.95\times10^5$, $M_w=1.69\times10^6$, $M_w/M_n=2.84$; with the major fraction at very low molecular weight with peak molecular weight at 430.

EXAMPLE 29

An evacuated 600 mL autoclave was charged with a solution of (Ie) —NiBr$_2$ (50 mg, 0.073 mmol) in 100 mL of chlorobenzene. The autoclave was heated to 70° C. To this solution was then added PMAO-IP (9.0 mL in toluene, 37.3 mmol) under 2.1 MPa of ethylene. The resulting mixture was stirred at 100° C. under 2.1 MPa of ethylene for 4.1 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 4×40 mL of hexane, and the hexane extracts combined with the oil. After being dried with MgSO$_4$, solvent was removed from the solution to give a soft waxy polymer (54.2 g). The branching distribution was quantified by $^{13}$C NMR. Branching per 1000 CH$_2$: Total methyls (105.7), Methyl (52.5), Ethyl (11.4), Propyl (2.1), Butyl (5.9), Amyl (4.4), and ≧Hexyl (29.4). GPC (in THF vs. polystyrene standards): $M_n=1640$, $M_w=2840$, $M_w/M_n=1.73$.

EXAMPLE 30

An evacuated 600 mL autoclave was charged with a solution of (If) —NiBr$_2$ (50 mg, 0.074 mmol) in 100 mL of chlorobenzene. The autoclave was heated to 70° C. To this solution was then added PMAO-IP (9.0 mL in toluene, 37.2 mmol) under 2.1 MPa of ethylene. The resulting mixture was stirred at 100° C. under 2.1 MPa of ethylene for 4.1 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separatory funnel and the oil separated from the aqueous phase. The aqueous phase was extracted with 4×40 mL of hexane, and the hexane extracts combined with the oil. After being dried with MgSO$_4$, solvent was removed from the solution to give an oily polymer (96.4 g). The branching distribution was quantified by $^{13}$C NMR. Branching per 1000 CH$^2$: Total methyls (65.3), Methyl (22.1), Ethyl (4.5), Propyl (1.1), Butyl (3.7), Amyl (11.9), and ≧Hexyl (22.0). GPC (in THF vs. polystyrene standards): $M_n=830$, $M_w=1240$, $M_w/M_n=1.50$.

EXAMPLE 31

An evacuated 600 mL autoclave was charged with a solution of (Ig) —NiBr$_2$ (20 mg, 0.035 mmol) in 100 mL of dichloromethane. To this solution was then added PMAO-IP (4.19 mL in toluene, 17.4 mmol) under 3.5 MPa of ethylene. The resulting mixture was stirred under 3.5 MPa of ethylene for 1.8 h. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separation funnel and the oil separated from the aqueous phase. The aqueous phase was extracted with 4×40 mL of hexane, and the hexane extracts combined with the oil. After being dried with MgSO$_4$, solvent was removed from the solution to give an oily polymer (17.5 g, two layers: top clear oil, bottom viscous oil). The branching distribution for the bottom phase polymer was quantified by $^{13}$C NMR. Branching per 1000 CH$_2$: Total methyls (114.1), Methyl (57.4), Ethyl (14.1), Propyl (1.6), Butyl (8.5), Amyl (1.6), and ≧Hexyl (30.2).

EXAMPLE 32

An evacuated 600 mL autoclave was charged with a solution of (IIa) —NiBr$_2$ (20 mg, 0.040 mmol) in 100 mL of chlorobenzene. To this solution was then added PMAO-IP (4.71 mL in toluene, 17.4 mmol) under 3.5 MPa of ethylene. The resulting mixture was stirred under 3.5 MPa of ethylene for 45 min. Ethylene was consumed very rapidly as indicated by the drop of ethylene pressure in the reservoir. After venting ethylene pressure and opening the reactor, the solution effervesced indicating the formation of butene and low oligomers.

EXAMPLE 33

An evacuated 600 mL autoclave was charged with a solution of (IIb) —NiBr$_2$ (20 mg, 0.042 mmol) in 100 mL of dichloromethane under nitrogen. To this solution was then added PMAO-IP (5.05 mL in toluene, 21 mmol) under 3.5 MPa of ethylene. The resulting mixture was stirred under 3.5 MPa of ethylene for 2 h. Ethylene was consumed very rapidly as indicated by the drop of ethylene pressure in the reservoir. Ethylene pressure was then vented and the reaction mixture quenched under air by the addition of 50 mL of isopropanol. The resulting slurry was stirred in a beaker with 100 mL methanol plus 10 mL concentrated HCl. Finally, 200 mL of water was added and an oil separated from the solution. The mixture was then transferred into a separatory funnel and the oil separated from the aqueous phase. The aqueous phase was extracted with 4×40 mL of hexane, and the hexane extracts combined with the oil. After being dried with $MgSO_4$, solvent was removed from the solution to give an oily polymer (22.97 g).

EXAMPLE 34

A 20 mL glass shaker-tube was charged with $CrCl_3.3THF$ (7.49 mg, 0.02 mmol), (Id) (8.25 mg, 0.02 mmol), and 1,2,4-trichlorobenzene (3.0 mL). The mixture was stirred to dissolve the solids, then was cooled to −30° C. Right after addition of 500 eq. Of PMAO-IP, the shaker-tube was added to a multi-shaker ethylene polymerization set up and pressurized with ethylene. The polymerization was carried out at 70° C. and 6.9 MPa ethylene pressure overnight with shaking (note this procedure used in all shaker tube olymerizations). A waxy polymer (6.77 g) was obtained.

EXAMPLE 35

A 20 mL glass shaker-tube was charged with $VCl_3.3THF$ (7.47 mg, 0.02 mmol), (Id) (8.25 mg, 0.02 mmol), and 1,2,4-trichlorobenzene (3.0 mL). The mixture was stirred to dissolve the solids, then was cooled to −30° C. Right after addition of 500 eq. Of PMAO-IP, the shaker-tube was added to a multi-shaker ethylene polymerization set up. The polymerization was carried out at 70° C. and 6.9 MPa ethylene pressure overnight. A white solid polymer (26.75 g) was obtained. The $T_m$ was 133.4° C. by DSC. No flow was observed by MI measurement, indicating high molecular weight for the polymer.

EXAMPLE 36

A 20 mL glass shaker-tube was charged with $TiCl_4$ (3.79 mg, 0.02 mmol), (Id) (8.25 mg, 0.02 mmol), and 1,2,4-trichlorobenzene (3.0 mL). The mixture was stirred to dissolve the solid, then was frozen to −30° C. Right after addition of 500 eq. Of PMAO-IP, the shaker-tube was assembled into a multi-shaker ethylene polymerization set up. The polymerization was carried out at 70° C. and 6.9 MPa ethylene pressure overnight. White polymer (16.72 g) was obtained. The $T_m$ was 134.9° C. by DSC. No flow was observed by MI measurement, indicating high molecular weight for the polymer.

EXAMPLE 37

A 20 mL glass shaker-tube was charged with $CrCl_3.3THF$ (7.49 mg, 0.02 mmol), (Ig) (7.15 mg, 0.02 mmol), and 1,2,4-trichlorobenzene (3.0 mL). The mixture was stirred to dissolve the, solid, then was frozen to −30° C. Right after addition of 1500 eq. of PMAO-IP, the shaker-tube was assembled into a multi-shaker ethylene polymerization set up. The polymerization was carried out at 70° C. and 6.9 MPa ethylene pressure overnight. Waxy polymer (11.51 g) was obtained.

EXAMPLE 38

A 20 mL glass shaker-tube was charged with $VCl_3.3THF$ (7.47 mg, 0.02 mmol), (Ig) (7.15 mg, 0.02 mmol), and 1,2,4-trichlorobenzene (3.0 mL). The mixture was stirred to dissolve the solid, then was frozen to −30° C. Right after addition of 500 eq. of PMAO-IP, the shaker-tube was assembled into a multi-shaker ethylene polymerization set up. The polymerization was carried out at 70° C. and 6.9 MPa ethylene pressure overnight. White polymer (31.85 g) was obtained. The $T_m$ was 134.2° C. by DSC. No flow was observed by MI measurement, indicating high molecular weight for the polymer.

EXAMPLE 39

A 20 mL glass shaker-tube was charged with $TiCl_4$ (3.79 mg, 0.02 mmol), (Ig) (7.15 mg, 0.02 mmol), and 1,2,4-trichlorobenzene (3.0 mL). The mixture was stirred to dissolve the solid, then was frozen to −30° C. Right after addition of 500 eq. of PMAO-IP, the shaker-tube was assembled into a multi-shaker ethylene polymerization set up. The polymerization was carried out at 70° C. and 6.9 MPa ethylene pressure overnight. White polymer (9.32 g) was obtained. The $T_m$ was be 133.1° C. by DSC. No flow was observed by MI measurement, indicating high molecular weight for the polymer.

EXAMPLE 40

A 20 mL glass shaker-tube was charged with $CrCl_3.3THF$ (7.49 mg, 0.02 mmol), (IIc) (5.19 mg, 0.02 mmol), and 1,2,4-trichlorobenzene (3.0 mL). The mixture was stirred to dissolve to solid, then was frozen to −30° C. Right after addition of 500 eq. of PMAO-IP, the shaker-tube was assembled into a multi-shaker ethylene polymerization set up. The polymerization was carried out at 70° C. and 6.9 MPa ethylene pressure overnight. Waxy polymer (6.87 g) was obtained.

EXAMPLE 41

A 20 mL glass shaker-tube was charged with $VCl_3.3THF$ (7.47 mg, 0.02 mmol), (IIc) (5.19 mg, 0.02 mmol), and 1,2,4-trichlorobenzene (3.0 mL). The mixture was stirred to dissolve the solid, then was frozen to −30° C. Right after addition of 500 eq. of PMAO-IP, the shaker-tube was assembled into a multi-shaker ethylene polymerization set up. The polymerization was carried out at 70° C. and 6.9 MPa ethylene pressure overnight. White polymer (24.93 g) was obtained. The $T_m$ was 132.3° C. by DSC. No flow was observed by MI measurement, indicating high molecular weight for the polymer.

EXAMPLE 42

A 20 mL glass shaker-tube was charged with $TiCl_4$ (3.79 mg, 0.02 mmol), (IIc) (5.19 mg, 0.02 mmol), and 1,2,4-trichlorobenzene (3.0 mL). The mixture was stirred to dissolve the solid, then was frozen to −30° C. Right after addition of 500 eq. of PMAO-IP, the shaker-tube was assembled into a multi-shaker ethylene polymerization set up. The polymerization was carried out at 70° C. and 6.9 MPa ethylene pressure overnight. White polymer (10.8 g) was obtained. The $T_m$ was 134.6° C. by DSC. No flow was observed by MI measurement, indicating high molecular weight for the polymer.

EXAMPLE 43

In a drybox, a catalyst stock solution of $VCl_3.3THF$ (7.47 mg, 0.02 mmol) and (Ig) (7.15 mg, 0.02 mmol) in 10 mL of dry chlorobenzene was prepared. The catalyst solution (1.0 mL) was withdrawn and diluted into 10 mL of dry chlorobenzene. The catalyst solution (containing 0.2 mol catalyst) was charged into an addition cylinder under nitrogen. A cocatalyst solution of MMAO (1.15 mL, 1000 eq.) in 100 mL heptane was charged into an evacuated 600 mL autoclave under nitrogen. The autoclave was heated 70° C. To this solution was then added MMAO/heptane solution from the addition cylinder under 3.5 MPa of ethylene. The resulting mixture was stirred at 70° C. under 3.5 MPa of ethylene for 5.37 h. Ethylene pressure was then vented and the reaction mixture quenched under air by the addition of 50 mL of isopropanol. A large excess of methanol was added into the mixture and the polymer powder was filtered, washed with methanol, and dried (12.2 g).

EXAMPLE 44

Following the same procedure as described in Example 43, an ethylene polymerization was run at 40° C. for 2.38 h. White polymer (7.1 g) was obtained.

EXAMPLE 45

Following the same procedure as described in Example 43, an ethylene polymerization was run at 100° C. for 1.82 h. White polymer (2.1 g) was obtained.

COMPARATIVE EXAMPLE A

A control polymerization was run with the same amount of VCl$_3$.3THF and MMAO but with no ligand. Following the same procedure as described in Example 43 but without addition of any ligand, a polymerization was run at 70° C. for 2.57 h. White polymer (0.44 g) was obtained.

What is claimed is:

1. A process for the production of polyethylene, comprising the step of contacting, at a temperature of about −100° C. to about +200° C., ethylene and a Ti, Cr, V, Zr, Hf or Ni complex of a ligand of the formula

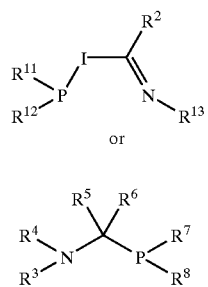

wherein:
  T is hydrocarbylene, substituted hydrocarbylene or —CR$^9$R$^{10}$—;
  R$^2$ is hydrogen, hydrocarbyl or substituted hydrocarbyl;
  R$^3$ is independently hydrocabyl or substituted hydrocarbyl, and R$^4$ is hydrogen, hydrocabyl or substituted hydrocarbyl, provided that a carbon atom bound to a nitrogen atom has at least two other carbon atoms bound to it, or provided that both R$^3$ and R$^4$ are ethyl;
  R$^5$ and R$^6$ are hydrogen;
  R$^7$ and R$^8$ are each independently hydrocarbyl or substituted hydrocarbyl, provided that a carbon atom bound to a phosphorous atom has at least two other carbon atoms bound to it;
  R$^9$ and R$^{10}$ are each independently hydrogen, hydrocarbyl or substituted hydrocarbyl;
  R$^{11}$ and R$^{12}$ are each independently hydrocarbyl or substituted hydrocarbyl;
  R$^{13}$ is hydrocarbyl or substituted hydrocarbyl; provided that R$^2$ and R$^9$ taken together may form a ring; and provided that, when (I) is a Ni complex, R$^{11}$ and R$^{12}$ are both t-butyl and/or T is not o-phenylene.

2. The process as recited in claim 1, wherein one or more of the following occurs:
  R$^3$ is hydrocarbyl;
  R$^4$ is hydrogen or alkyl;
  R$^7$ and R$^8$ are independently saturated hydrocarbyl;
  R$^{13}$ is alkyl or halogen substituted aryl;
  R$^{11}$ and R$^{12}$ are each independently hydrocarbyl or substituted hydrocarbyl;
  T is —CHR$^{14}$— wherein R$^{14}$ is hydrogen or alkyl containing 1 to 6 carbon atoms, T is —CR$^9$R$^{10}$—, or T is o-phenylene;
  R$^{10}$ is hydrogen; and
  R$^2$ and R$^9$ taken together form a ring.

3. The process as recited in claim 1, wherein one or more of the following occurs:
  R$^3$ is alkyl or halogen substituted aryl;
  R$^7$ and R$^8$ are independently alkyl or cycloalkyl containing 3 to 8 carbon atoms;
  R$^{13}$ is 2,6-disubstituted phenyl which may optionally be substituted in other positions;
  R$^{11}$ and R$^{12}$ are each hydrocarbyl in which the carbon atom bound to the phosphorous atom is bound to at least 2 other carbon atoms;
  T is —CHR$^{14}$— wherein R$^{14}$ is hydrogen or alkyl containing 1 to 6 carbon atoms, T is —CR$^9$R$^{10}$—, or T is o-phenylene; and
  R$^{10}$ is hydrogen; and
  R$^2$ and R$^9$ taken together form a carbocyclic ring.

4. The process as recited in claim 1 wherein said ligand is

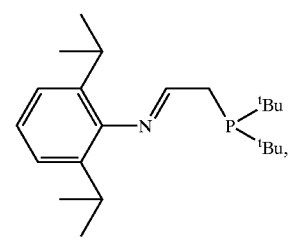

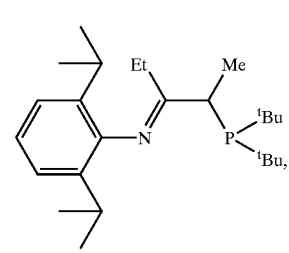

(Ic)
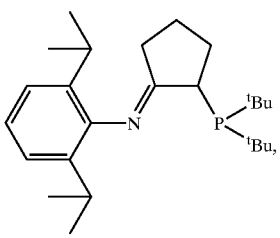

(Id)
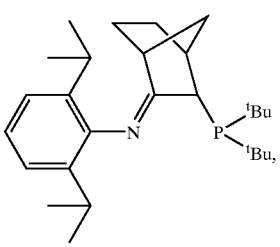

(Ie)
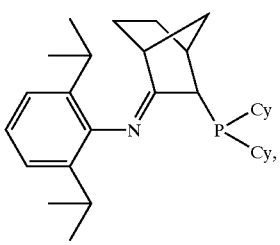

(If)
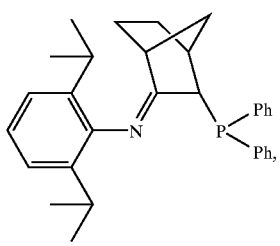

(Ig)
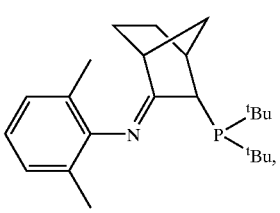

(Ih)
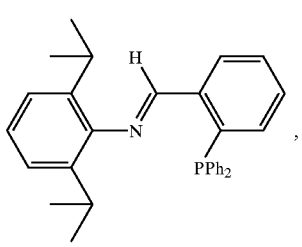

(IIa)
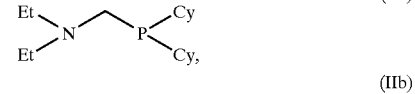

(IIb)
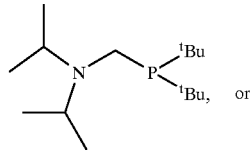

(IIc)
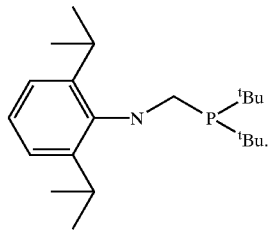

wherein Me is methyl, Et is ethyl, Bu is butyl, Cy is cyclohexyl, and Ph is phenyl.

5. The process as recited in claim 1, wherein said temperature is about 25° C. to about 100° C.

6. The process as recited in claim 1, wherein one or more other polymerization catalysts and, optionally, one or more other monomers polymerizable by said other polymerization catalyst, is present.

7. The process as recited in claim 1, wherein M is Ni.

8. A process for the production of polyethylene, comprising the step of contacting, at a temperature of about −100° C. to about +200° C., ethylene, a compound of the formula (IV)
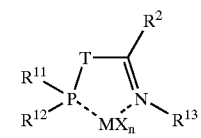

or (V)
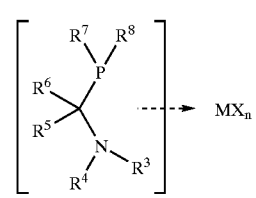

and:

(a) a first compound W, which is a neutral Lewis acid capable of abstracting $X^-$ and alkyl group or a hydride group from M to form $WX^-$, $(WR^{20})^-$ or $WH^-$ and which is also capable of transferring an alkyl group or a hydride to M, provided that $WX^-$ is a weakly coordinating anion; or (b) a combination of second compound which is capable of transferring an alkyl or hydride group to M and a third compound which is a neutral Lewis acid which is capable of abstracting $X^-$, a hydride or an alkyl group from M to form a weakly coordinating anion;

wherein:

M is Ti, Cr, V, Zr, Hf or Ni;

each X is an anion;

n is an integer so that the total number of negative charges on said anion or anions is equal to the oxidation sate of M;

T is hydrocarbylene, substituted hydrocarbylene or —CR$^9$R$^{10}$—;

R$^2$ is hydrogen, hydrocarbyl or substituted hydrocarbyl;

R$^3$ is independently hydrocabyl or substituted hydrocarbyl, and R$^4$ is hydrogen, hydrocabyl or substituted hydrocarbyl, provided that a carbon atom bound to a nitrogen atom has at least two other carbon atoms bound to it, or provided that both R$^3$ and R$^4$ are ethyl;

R$^5$ and R$^6$ are hydrogen;

R$^7$ and R$^8$ are each independently hydrocarbyl or substituted hydrocarbyl, provided that a carbon atom bound to a phosphorous atom has at least two other carbon atoms bound to it;

R$^9$ and R$^{10}$ are each independently hydrogen, hydrocarbyl or substituted hydrocarbyl;

R$^{11}$ and R$^{12}$ are each independently hydrocarbyl or substituted hydrocarbyl;

R$^{13}$ is hydrocarbyl or substituted hydrocarbyl; provided that R$^2$ and R$^9$ taken together may form a ring; and provided that, when M is Ni in (IV), R$^{11}$ and R$^{12}$ are both t-butyl and/or T is not o-phenylene.

9. The process as recited in claim 8, wherein one or more of the following occurs:

R$^3$ is hydrocarbyl;

R$^4$ is hydrogen or alkyl;

R$^7$ and R$^8$ are independently saturated hydrocarbyl;

R$^{13}$ is alkyl or halogen substituted aryl;

R$^{11}$ and R$^{12}$ are each independently hydrocarbyl or substituted hydrocarbyl;

T is —CHR$^{14}$— wherein R$^{14}$ is hydrogen or alkyl containing 1 to 6 carbon atoms, T is —CR$^9$R$^{10}$—, or T is o-phenylene;

R$^{10}$ is hydrogen; and

R$^2$ and R$^9$ taken together form a ring.

10. The process as recited in claim 8, wherein one or more of the following occurs:

R$^3$ is alkyl or halogen substituted aryl;

R$^7$ and R$^8$ are independently alkyl or cycloalkyl containing 3 to 8 carbon atoms;

R$^{13}$ is 2,6-disubstituted phenyl which may optionally be substituted in other positions;

R$^{11}$ and R$^{12}$ are each hydrocarbyl in which the carbon atom bound to the phosphorous atom is bound to at least 2 other carbon atoms;

T is —CHR$^{14}$— wherein R$^{14}$ is hydrogen or alkyl containing 1 to 6 carbon atoms, T is —CR$^9$R$^{10}$—, or T is o-phenylene; and R$^{10}$ is hydrogen; and R$^2$ and R$^9$ taken together form a carbocylic ring.

11. The process as recited in claim 8, wherein a ligand coordinated to M is

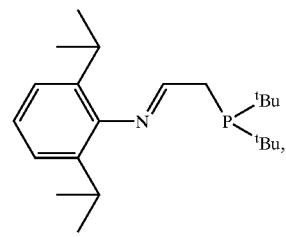

(Ia)

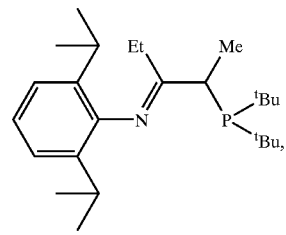

(Ib)

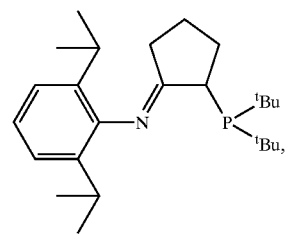

(Ic)

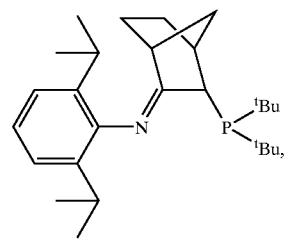

(Id)

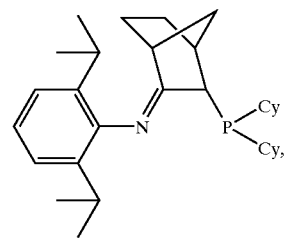

(Ie)

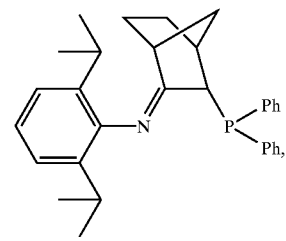

(If)

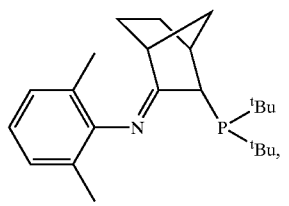

(Ig)

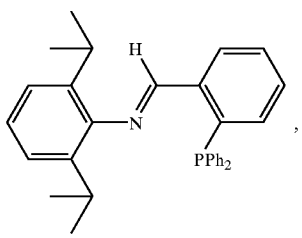

(Ih)

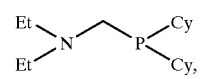

(IIa)

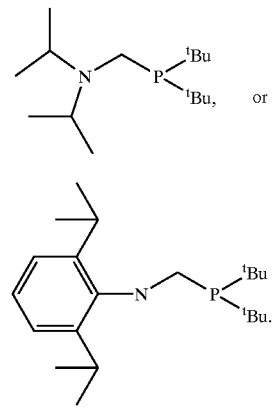

(IIb)

or (IIc)

wherein Me is methyl, Et is ethyl, Bu is butyl, Cy is cyclohexyl, and Ph is phenyl.

12. The process as recited in claim 8, wherein W is an alkylaluminum compound.

13. The process as recited in claim 8, wherein said temperature is about 25° C. to about 100° C.

14. The process as recited in claim 12, wherein (IV) is said compound, and wherein a homopolyethylene having a Mark-Houwink constant of about 1.0 or more in 1,2,4-trichlorobenzene is produced.

15. The process as recited in claim 8, wherein one or more other polymerization catalysts and, optionally, one or more other monomers polymerizable by said other polymerization catalyst, is present.

16. The process as recited in claim 8, wherein M is Ni.

17. A process for the production of polyethylene, comprising the step of contacting, at a temperature of about −100° C. to about +200° C., ethylene and a compound of the formula

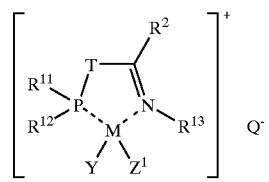

(VI)

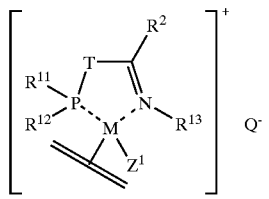

(VII)

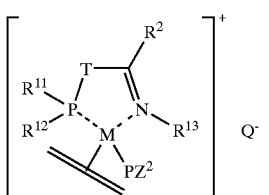

(VIII)

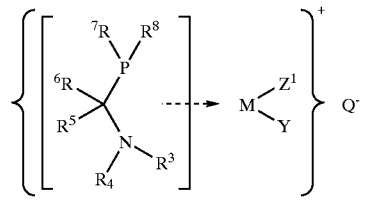

(IX)

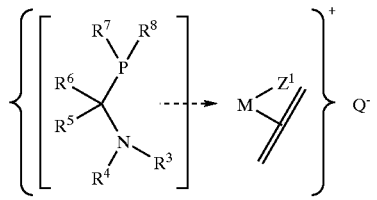

(X)

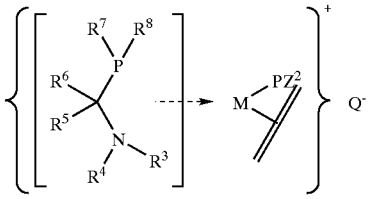

(XI)

wherein:

M is Ti, Cr, V, Zr, Hf or Ni;

each X is an anion;

n is an integer so that the total number of negative charges on said anion or anions is equal to the oxidation sate of M;

T is hydrocarbylene, substituted hydrocarbylene or —CR$^9$R$^{10}$—;

R$^2$ is hydrogen, hydrocarbyl or substituted hydrocarbyl;

R$^3$ is independently hydrocabyl or substituted hydrocarbyl, and R$^4$ is hydrogen, hydrocabyl or substituted hydrocarbyl, provided that a carbon atom bound to a nitrogen atom has at least two other carbon atoms bound to it, or provided that both R$^3$ and R$^4$ are ethyl;

$R^5$ and $R^6$ are hydrogen;

$R^7$ and $R^8$ are each independently hydrocarbyl or substituted hydrocarbyl, provided that a carbon atom bound to a phosphorous atom has at least two other carbon atoms bound to it;

$R^9$ and $R^{10}$ are each independently hydrogen, hydrocarbyl or substituted hydrocarbyl;

$R^{11}$ and $R^{12}$ are each independently hydrocarbyl or substituted hydrocarbyl;

$R^{13}$ is hydrocarbyl or substituted hydrocarbyl;

$Z^1$ is hydride or alkyl or any other anionic ligand into which ethylene can insert;

Y is a neutral ligand capable of being displaced by ethylene or a vacant coordination site;

Q is a relatively non-coordinating anion;

P is a divalent polyethylene group containing one or more ethylene molecules; and $Z^2$ is an end group; provided that $R^2$ and $R^9$ taken together may form a ring; and provided that, when M is Ni in (VI), $R^{11}$ and $R^{12}$ are both t-butyl and/or T is not o-phenylene.

18. The process as recited in claim 17, wherein one or more of the following occurs:

$R^3$ is hydrocarbyl;

$R^4$ is hydrogen or alkyl;

$R^7$ and $R^8$ are independently saturated hydrocarbyl;

$R^{13}$ is alkyl or halogen substituted aryl;

$R^{11}$ and $R^{12}$ are each independently hydrocarbyl or substituted hydrocarbyl;

T is —$CHR^{14}$— wherein $R^{14}$ is hydrogen or alkyl containing 1 to 6 carbon atoms, T is —$CR^9R^{10}$—, or T is o-phenylene;

$R^{10}$ is hydrogen; and $R^2$ and $R^9$ taken together form a ring.

19. The process as recited in claim 17, wherein one or more of the following occurs:

$R^3$ is alkyl or halogen substituted aryl;

$R^7$ and $R^8$ are independently alkyl or cycloalkyl containing 3 to 8 carbon atoms;

$R^{13}$ is 2,6-disubstituted phenyl which may optionally be substituted in other positions;

$R^{11}$ and $R^{12}$ are each hydrocarbyl in which the carbon atom bound to the phosphorous atom is bound to at least 2 other carbon atoms;

T is —$CHR^{14}$— wherein $R^{14}$ is hydrogen or alkyl containing 1 to 6 carbon atoms, T is —$CR^9R^{10}$—, or T is o-phenylene; and $R^{10}$ is hydrogen; and $R^2$ and $R^9$ taken together form a carbocylic ring.

20. The process as recited in claim 17, wherein said temperature is about 25° C. to about 100° C.

21. The process as recited in claim 17, wherein one or more other polymerization catalysts and, optionally, one or more other monomers polymerizable by said other polymerization catalyst is present.

22. The process as recited in claim 17, wherein M is Ni.

* * * * *